(12) United States Patent
Ogata et al.

(10) Patent No.: US 6,987,544 B2
(45) Date of Patent: Jan. 17, 2006

(54) METHOD AND APPARATUS FOR PROCESSING IMAGE

(75) Inventors: Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 530 days.

(21) Appl. No.: 10/176,270

(22) Filed: Jun. 20, 2002

(65) Prior Publication Data

US 2003/0016306 A1    Jan. 23, 2003

(30) Foreign Application Priority Data

Jun. 20, 2001    (JP) ............................ P2001-187145

(51) Int. Cl.
*H04N 5/235*    (2006.01)

(52) U.S. Cl. .................................... 348/678

(58) Field of Classification Search ................ 348/687, 348/688, 694, 702; 382/254, 266, 274, 269, 382/284, 300, 162
See application file for complete search history.

(56) References Cited

U.S. PATENT DOCUMENTS

| | | | | |
|---|---|---|---|---|
| 5,392,139 A | * | 2/1995 | Murata | ...................... 358/529 |
| 5,588,069 A | * | 12/1996 | Katayama et al. | .......... 382/166 |
| 5,729,360 A | * | 3/1998 | Kita et al. | .................... 358/500 |
| 5,870,491 A | * | 2/1999 | Kawai et al. | ................ 382/181 |
| 6,130,966 A | * | 10/2000 | Sekine et al. | ................ 382/299 |
| 6,148,115 A | * | 11/2000 | Mackinnon et al. | ........ 382/266 |
| 6,198,841 B1 | * | 3/2001 | Toyama et al. | ............. 382/164 |
| 6,229,578 B1 | * | 5/2001 | Acharya et al. | ............ 348/607 |
| 6,417,891 B1 | * | 7/2002 | Cacciatore et al. | ......... 348/649 |

* cited by examiner

*Primary Examiner*—Paulos M. Natnael
(74) *Attorney, Agent, or Firm*—Sonnenschein, Nath & Rosenthal LLP (57) ABSTRACT

Each of a plurality of input images is smoothed. A plurality of smoothed images different from each other in the degree of smoothing thus results. Each of first and second synthesizers calculate an edge intensity based on an intermediate synthesized image generated from at least one smoothed image and having a relatively large degree of smoothing and another smoothed image having a relatively small degree of smoothing, and synthesizes the intermediate synthesized image and the smoothed image based on the edge intensity, thereby generating a synthesized smoothed image. A second synthesized smoothed image generated by the second synthesizer is output as a final synthesized smoothed image representing an illumination component, and is then used as a coefficient for converting a pixel value.

18 Claims, 10 Drawing Sheets

| 1/16 | 1/8 | 1/16 |
|---|---|---|
| 1/8 | 1/4 | 1/8 |
| 1/16 | 1/8 | 1/16 |

PRIOR ART

FIG. 11

PRIOR ART

PRIOR ART

METHOD AND APPARATUS FOR PROCESSING IMAGE

RELATED APPLICATION DATA

The present application claims priority to Japanese Application(s) No(s). P2001-187145 filed Jun. 20, 2001, which application(s) is/are incorporated herein by reference to the extent permitted by law.

BACKGROUND OF THE INVENTION

1. Field of the Invention

The present invention relates to an image processing method and an image processing apparatus for use in an input and output apparatus for handling a variety of videos, such as a television set, a video cassette recorder, a still camera, a video camera, and a printer and, in particular, to an image processing method and an image processing apparatus for reproducing an input image into an image having a relatively narrow dynamic range on a video apparatus.

2. Description of the Related Art

Figure 10:
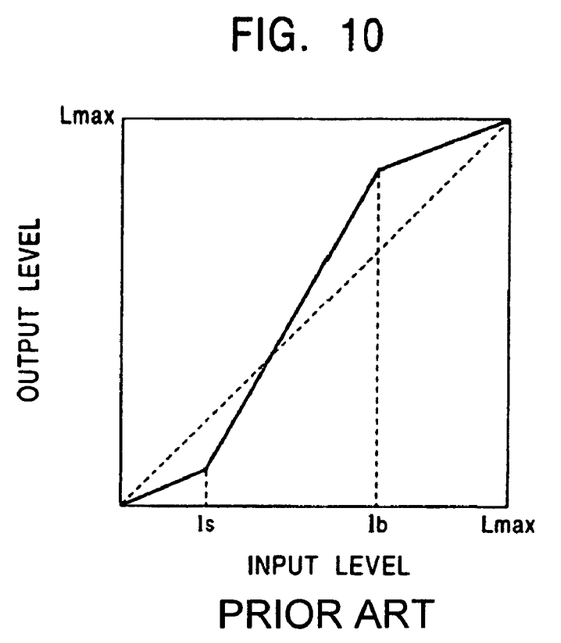
FIG. 10 is a chart of a conventional level conversion function.

A conventionally available method for converting the tonal gradation of pixels in an input image (hereinafter referred to "level conversion") shifts a level of each pixel according to a function having an input and output relationship (hereinafter referred to as a "level conversion function") represented by a solid line plotted in FIG. 10. Referring to FIG. 10, the abscissa represents the pixel level (input level) l of the input image, and the ordinate represents a pixel level (output level) T(l) of an output image as a result of a level conversion process. Lmax represents a maximum level taken by each pixel of the input and output images. Subsequent to the level conversion, the contrast of the image increases as the gradient of the level conversion function increases. With reference to FIG. 10, the gradients of straight lines above a threshold of an input level 1b and below a threshold of an input level 1s are smaller than the gradient of an intermediate-level straight line (between the input threshold levels 1s and 1b). The level conversion using the function illustrated in FIG. 10 increases the contrast of the intermediate level at the expense of the high-level and low-level ranges.

Figure 11:
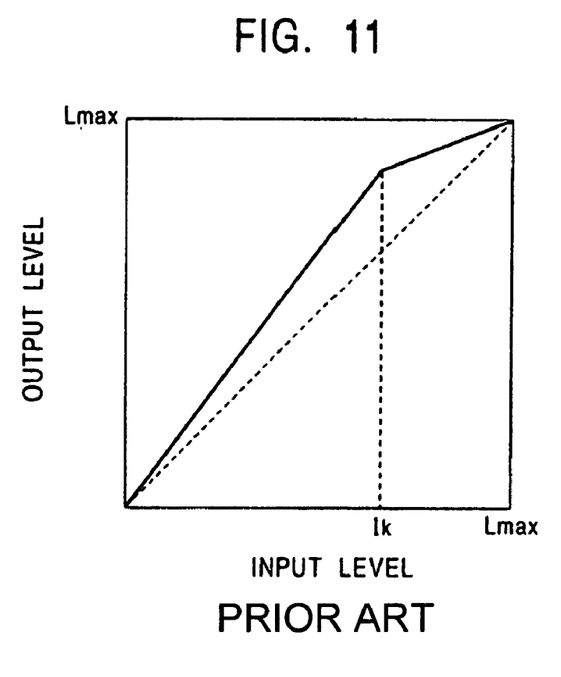
FIG. 11 is a chart of another conventional level conversion function.

The level conversion function is not limited to the one shown in FIG. 10. For example, the level conversion function represented in a solid line plotted in FIG. 11 may be used. In the level conversion function plotted in FIG. 11, the gradient of a straight line on the high level region above an input threshold level lk is smaller than the gradient of a straight line in the intermediate- and the low-level regions below the input threshold level lk. In the level conversion function shown in FIG. 11, the contrast in the intermediate- and low-level regions is increased at the expense of the contrast in the high-level region. The gamma function expressed in equation (1) and the LOG function expressed in equation (2), more continuous than the functions illustrated in FIGS. 10 and 11, may also be used as a level conversion function. The letter g in equation (1) is a parameter adjusting the gradient of the function.

$$T(l) = \left(\frac{l}{L\max}\right)^g \times L\max \tag{1}$$

$$T(l) = \frac{\log(l)}{\log(L\max)} \times L\max \tag{2}$$

Figure 12A:
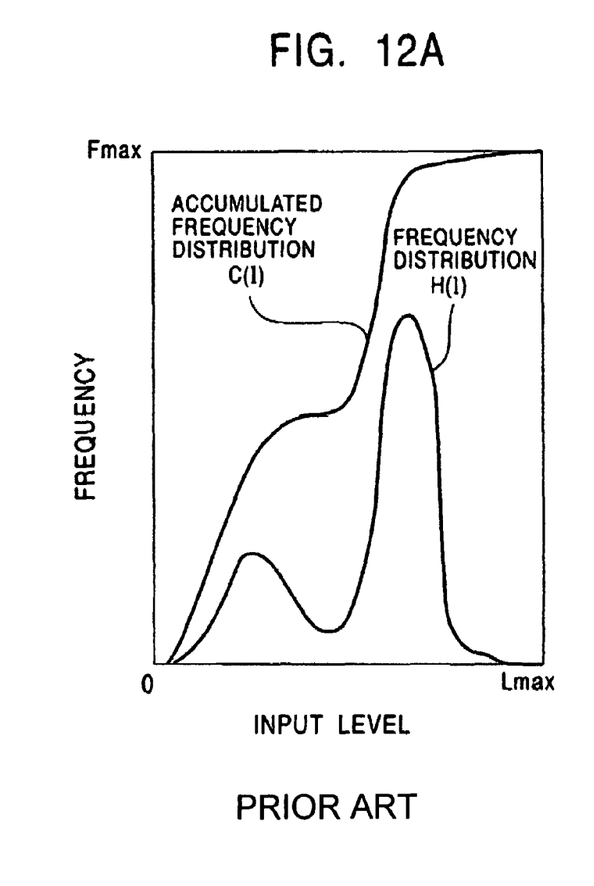
FIGS. 12A and 12B illustrate the principle of the histogram equalization.
Figure 12B:
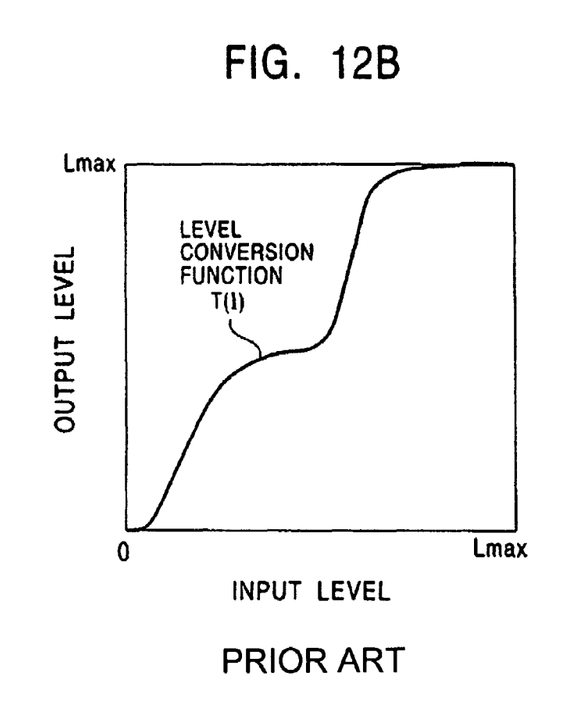

Another conventional method adaptively changes a level conversion function depending on the frequency distribution of the pixel level in an input image. There is a method called histogram equalization representative of such methods. FIGS. 12A and 12B illustrate the principle of the histogram equalization. Referring to FIG. 12A, the abscissa represents the pixel level (input level) l of the input image, and the ordinate represents frequency (frequency of occurrences, or accumulated frequency of occurrences). Fmax represents the maximum value of the accumulated frequency of occurrences, and is thus a total number of pixels used to calculate the frequency of occurrences. In this method, the frequency distribution H(l) relating to the pixel level l in the input image is first generated as illustrated in FIG. 12A, and then the accumulated frequency distribution C(l) is generated using the following equation (3).

$$C(l) = \sum_{k=0}^{l} H(k) \tag{3}$$

The level conversion function T(l) is generated by normalizing the ordinate of the accumulated frequency distribution C(l) within a level range that can be taken by an output image, using the following equation (4) (see FIG. 12B). Using the function T(l), the contrast of a region (having a large area) presenting high frequency of occurrences is increased.

$$T(l) = \frac{C(l)}{F\max} \times L\max \tag{4}$$

When an input image is used in a narrow dynamic range environment, namely, in an environment where a number of bits expressing pixel levels is small (for example, when the input image is transmitted over a transmission line having a smaller bit width, when the input image is displayed on a display using a small number of bits, or when the input image is stored in a storage device using a smaller number of bits), the dynamic range needs to be narrowed. To compress the dynamic range, the level conversion as discussed above is used. The maximum level of the image output in accordance with the level conversion function becomes smaller than that of the input image.

Another dynamic range compression method has been proposed in a paper entitled "A Multiscale Retinex for Color Rendition and Dynamic Range Compression in Applications of Digital Image Processing" authored by Z. Rahman, et. al., XIX Proc. SPIE 2847 (1996). According to this paper, an illumination light component that mildly changes in space is extracted using a low-pass filter, and is then compressed thereby to compress entire dynamic range (hereinafter this method is called "multiscale retinex"). A narrow-band linear low-pass filter is used to extract the illumination component. In accordance with this method, the dynamic range is compressed by subtracting the logarithm of a low-pass filter output LPF (I(x,y)) from the logarithm of the value I(x,y) of an input pixel.

$$O(x, y) = \log(I(x, y)) - \log(LPF(I(x, y))) \quad (5)$$

The above-referenced level conversion methods employ level conversion functions having a monotonously increasing property to avoid the generation of unnatural images. when the contrast in one level range (namely, the gradient of the level conversion function) is increased, the contrast in another level range is reduced.

The mutliscale retinex method allows an image of high contrast to be reproduced at the expense of the monotonously increasing property. However, when illumination conditions sharply change, the linear filter cannot extract such a change. Subjectively unwanted noise occurs.

Figure 13:
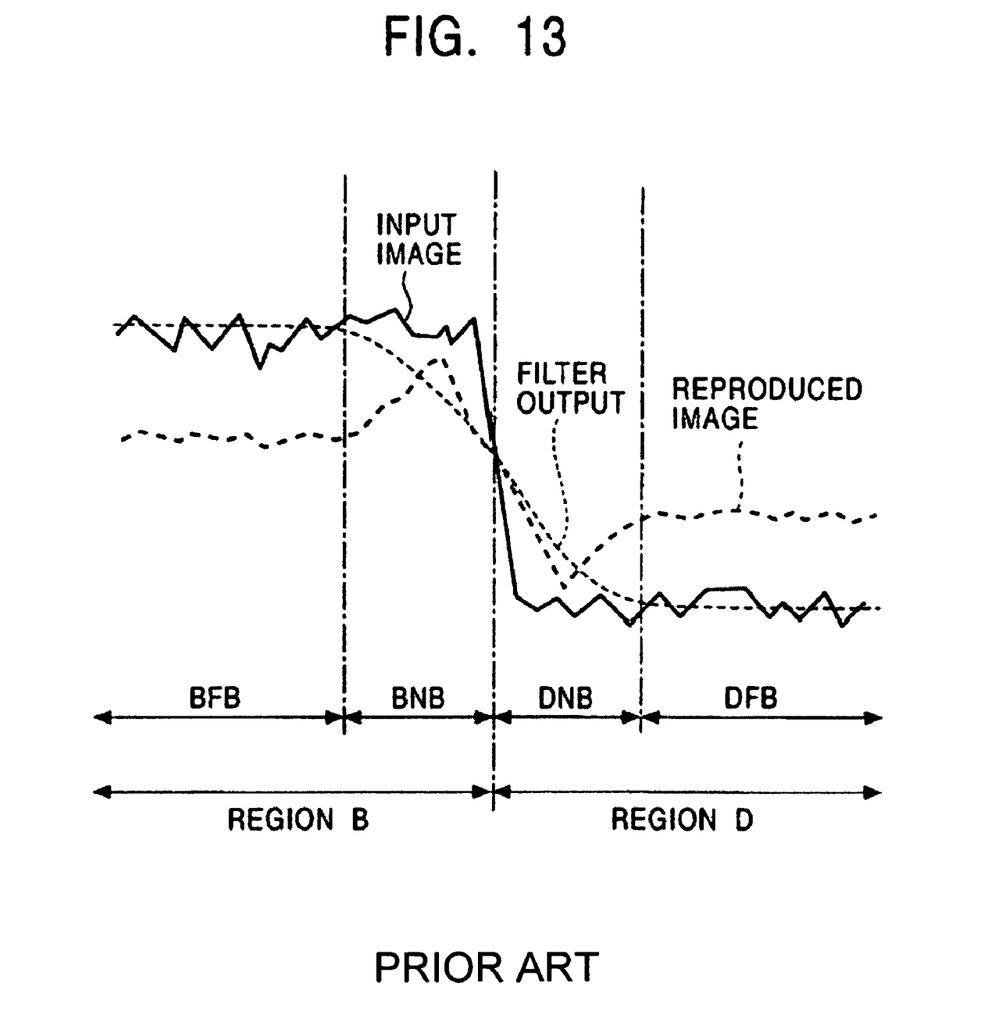
FIG. 13 is a diagram illustrating the problem of the multiscale retinex.

For example, when linear low-pass filtering is performed on an image with two bordering regions having different illumination conditions (as represented by a solid line) in FIG. 13, a signal represented by a fine broken line and having a blurred border is obtained as a filter output. When the signal is treated as an illumination component, an illumination level is lower in a border area (a BNB area) than in an area (a BFB area) apart from the border in the left-hand side (a region B) of an illumination border. The aforementioned equation (5) is equivalent to a division operation in which an input signal is divided by an illumination component. The larger the illumination component, the more the dynamic range is compressed. As a result, an overshoot occurs in the BNB area in the reproduced image (as represented by a broken line). Conversely, the illumination level is regarded as higher in a border area (a DNB area) than in an area apart (a DFB area) from the border in the right-hand side (a region D) of the illumination border. Then, an undershoot occurs. In the mutliscale retinex method, a plurality of low-pass filters having different scales is used to avoid this problem. Results obtained from the low-pass filters are synthesized by using linear weights. The weights for the filters are fixed, and the aforementioned problem is not satisfactorily controlled.

SUMMARY OF THE INVENTION

Accordingly, it is an object of the present invention to provide an image processing method and an image processing apparatus for appropriately extracting a border between a plurality of different illuminations, if present, and for compressing a dynamic range in a subjectively preferable fashion.

An image processing method of the present invention includes a smoothing step for smoothing each of a plurality of images, into which the input image is segmented, to generate a plurality of smoothed images different from each other in the degree of smoothing, an edge intensity calculating step for calculating an edge intensity based on the plurality of smoothed images, a synthesizing step for synthesizing the plurality of smoothed images based on the calculated edge intensity, a coefficient calculating step for calculating a coefficient for use in the conversion of pixel values of the input image based on the synthesized smoothed image generated through the synthesis of the plurality of smoothed images, and a pixel value converting step for converting the pixel values of the input image based on the calculated coefficient.

Preferably, the smoothing step calculates a plurality of coefficients for use in the conversion of the pixel values by performing a non-linear conversion on the pixels value of each smoothed image, the synthesizing step synthesizes the plurality of coefficients based on the edge intensity, and outputs the synthesized coefficient as a coefficient calculated in the coefficient calculating step, and the pixel value converting step converts the pixel values of the input image based on the coefficient generated as a result of the synthesis of the plurality of coefficients.

An image processing apparatus of the present invention includes a smoothing unit for smoothing each of a plurality of segmented input images to generate a plurality of smoothed images different from each other in the degree of smoothing, an edge intensity calculating unit for calculating an edge intensity based on the plurality of smoothed images, a synthesizing unit for synthesizing the plurality of smoothed images based on the calculated edge intensity, a coefficient calculating unit for calculating a coefficient for use in the conversion of pixel values of the input image based on the synthesized smoothed image generated through the synthesis of the plurality of smoothed images, and a pixel value converting unit for converting the pixel values of the input image based on the calculated coefficient.

Preferably, the smoothing unit calculates a plurality of coefficients for use in the conversion of the pixel values by performing a non-linear conversion on the pixels value of each smoothed image, the synthesizing unit synthesizes the plurality of coefficients based on the edge intensity, and outputs the synthesized coefficient as a coefficient calculated in the coefficient calculating unit, and the pixel value converting unit converts the pixel values of the input image based on the coefficient generated as a result of the synthesis of the plurality of coefficients.

In accordance with the present invention, a plurality of smoothed images different from each other in the degree of smoothing is generated. The edge intensity is calculated based on the plurality of smoothed images. The plurality of smoothed images is synthesized based on the calculated edge intensity. The coefficient for use in the conversion of the pixel values of the input image is calculated. The pixel values are then converted based on the coefficient. In this way, the border is appropriately extracted even if a plurality of different illuminations is present.

In the present invention, the edge intensity may be calculated by determining a weighted sum of a first derivative and a second derivative of the smoothed image. In this case, the second derivative of the smoothed image may be determined from a difference between two smoothed images that are close to each other in the degree of smoothing.

In the present invention, a synthesis process may be performed by synthesizing an intermediate synthesized image generated from at least one smoothed image having a relatively large degree of smoothing and another unsynthesized smoothed image having a relatively small degree of smoothing. The synthesis process of the intermediate synthesized image and the other smoothed image may be performed by determining the weighted sum of the intermediate synthesized image and the other smoothed image.

The coefficient for use in the conversion of the pixel values of the image may be calculated by non-linearly converting each pixel value of the synthesized smoothed image.

DESCRIPTION OF THE PREFERRED EMBODIMENTS

The embodiments of the present invention are discussed below with reference to the drawings.

First Embodiment

Figure 2:
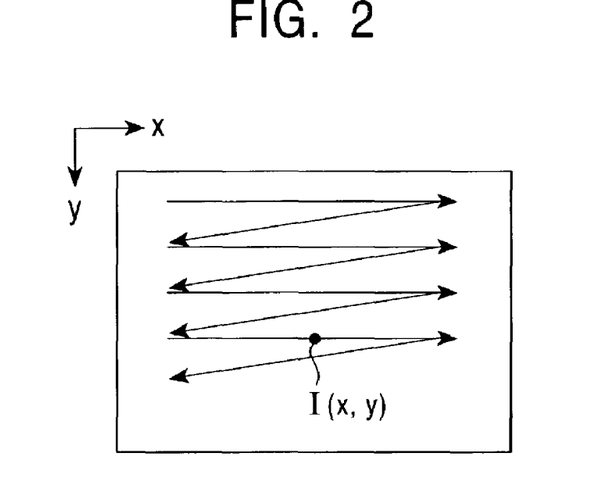
FIG. 2 illustrates the direction of scanning of an image.

An input image signal to be processed by an image processing apparatus of the present invention will now be discussed. The input image signal to be processed by the image processing apparatus is a signal of time-series pixel values that are obtained by scanning a two-dimensional digital image in horizontal directions and then a vertical direction as shown in FIG. 2. In a first embodiment, a pixel value I(x,y) at any position (x,y) in the two-dimensional image is processed as an input image signal.

Figure 1:
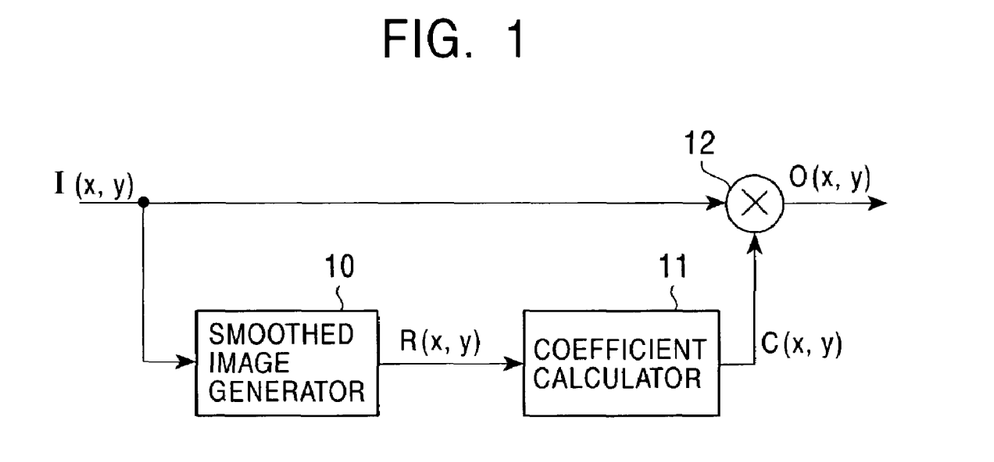
FIG. 1 is a block diagram illustrating the construction of the image processing apparatus in accordance with one embodiment of the present invention.

The construction of the image processing apparatus of the first embodiment is discussed below. The image processing apparatus includes a smoothed image generator 10, a coefficient calculator 11, and a multiplier 12 as illustrated in FIG. 1.

Figure 5:
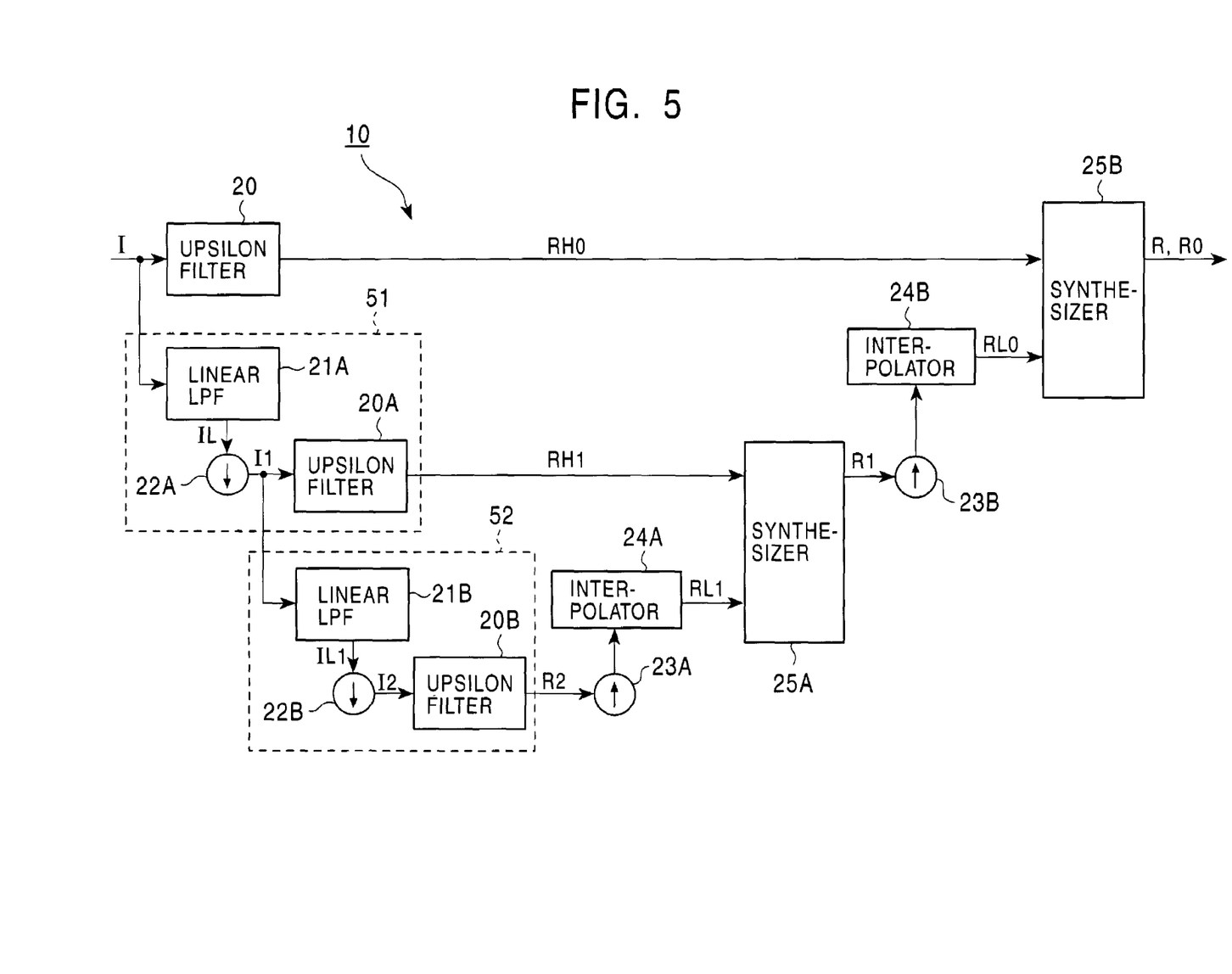
FIG. 5 is a block diagram illustrating a smoothed image generator in the image processing apparatus shown in FIG. 1.

The smoothed image generator 10 performs a smoothing process on each pixel value I(x,y) of an input image I. Referring to FIG. 5, the smoothed image generator 10 specifically includes a plurality of upsilon filters 20, 20A, and 20B, a plurality of low-pass filters (referred to as LPF in FIG. 5) 21A, and 21B, a plurality of down-sampling units 22A and 22B, a plurality of up-sampling units 23A and 23B, a plurality of interpolators 24A and 24B, and a plurality of synthesizer devices 25A and 25B.

Figure 7:
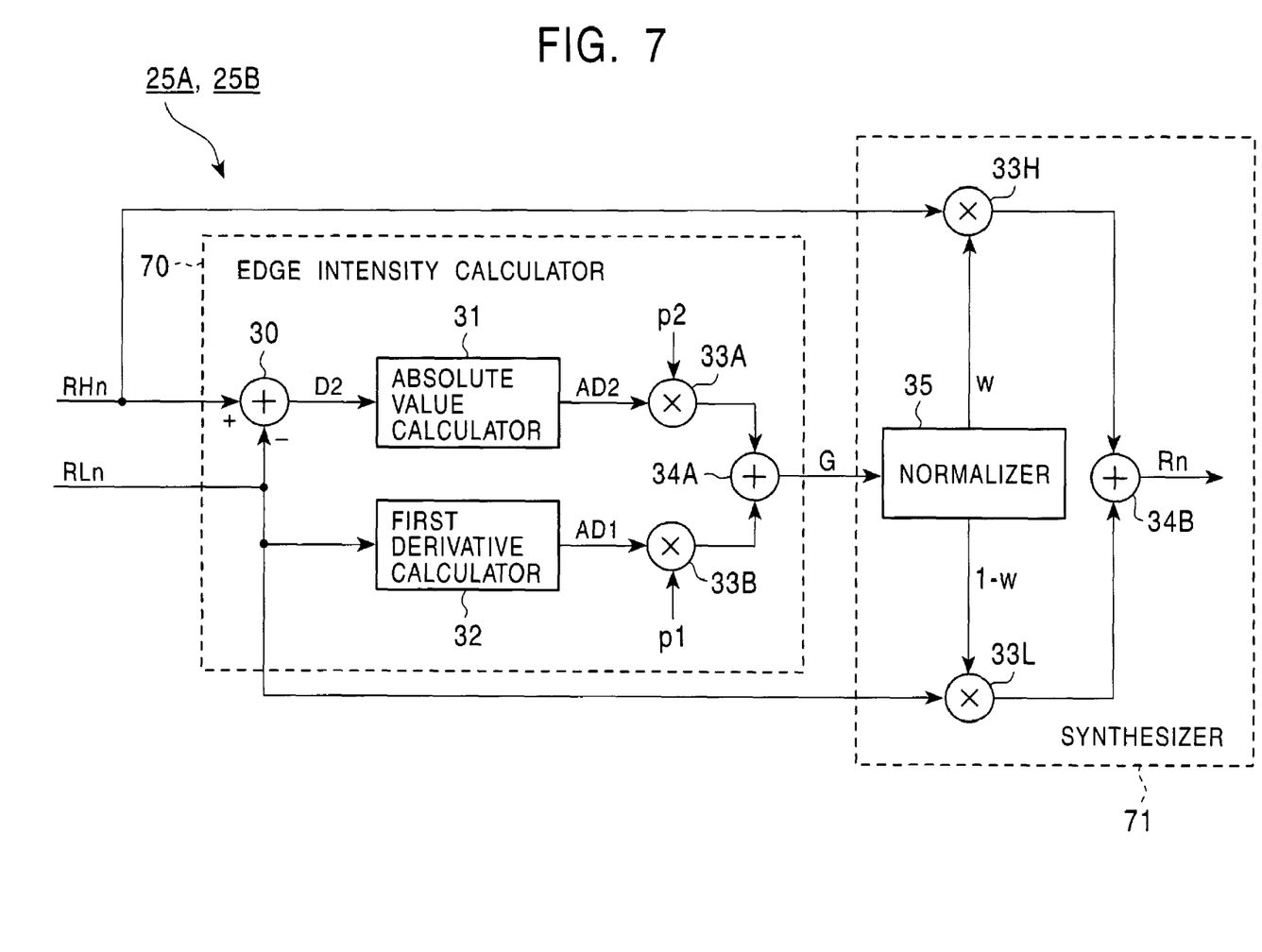
FIG. 7 is a block diagram illustrating the construction of a synthesizer in the smoothed image generator shown in FIG. 1.

Specifically, each of the synthesizer devices 25A and 25B in the smoothed image generator 10 includes an edge intensity calculator 70 and a synthesizer 71 as illustrated in FIG. 7. The edge intensity calculator 70 includes a difference unit 30, an absolute value calculator 31, a first derivative calculator 32, multipliers 33A and 33B, and a first adder 34A. The synthesizer 71 includes multipliers 33H and 33L, a second adder 34B, and a normalizer 35.

The process performed by the smoothed image generator 10 includes process steps for segmenting an input image I into a plurality of images, and for smoothing each of segmented images I to generate a plurality of smoothed images RH0, RH1, and R2 different from each other in the degree of smoothing as shown in FIG. 5.

From among the plurality of smoothed images RH0, RH1, and R2, a first smoothed image RH0, generated by a first upsilon filter 20, has a relatively small degree of smoothing, and provides the highest resolution. A second smoothed image RH1 has a larger degree of smoothing than the first smoothed image RH0, and provides a lower resolution. The second smoothed image RH1 is generated by a smoothing unit 51 (including the first linear low-pass filter 21A, the first down-sampling unit 22A, and the second upsilon filter 20A). A third smoothed image R2 has the largest degree of smoothing and provides the lowest resolution. A smoothing unit 52 (including the second linear low-pass filter 21B, the second down-sampling unit 22B, and the third upsilon filter 20B) generates the third smoothed image R2 from an image I1 output from the first down-sampling unit 22A.

The process performed by the smoothed image generator 10 also includes process steps for calculating the edge intensity G based on the plurality of smoothed images, and for synthesizing the plurality of smoothed images based on the calculated edge intensity G. These process steps are chiefly performed by the synthesizer devices 25A and 25B. Specifically, the process step for calculating the edge intensity G is performed by the edge intensity calculator 70 (see FIG. 5) in each of the synthesizer devices 25A and 25B. The process step for smoothing the images is performed by the synthesizer 71.

More specifically, each of the synthesizer devices 25A and 25B calculates the edge intensity G based on an intermediate synthesized image RLn (n=1, 2) generated from at least one smoothed image and having a relatively large degree of smoothing, and an unsynthesized smoothed image RHn having a relatively small degree of smoothing, and then synthesizes the intermediate synthesized image RLn and the smoothed image RHn based on the calculated edge intensity G. For example, the edge intensity calculator 70 in the second synthesizer device 25B receives the intermediate synthesized image RL0 that is generated by synthesizing the two smoothed images RH1 and R2 having small degrees of smoothing, and the first smoothed image RH0 having a large degree of smoothing, and then calculates the edge intensity G. The synthesizer 71 in the second synthesizer device 25B synthesizes the intermediate synthesized image RL0 and the first smoothed image RH0 based on the calculated edge intensity G, thereby generating the synthesized smoothed image R.

The pixel value R(x,y) of the synthesized smoothed image R generated by the smoothed image generator 10 is fed to the coefficient calculator 11 as an illumination component.

Figure 3:
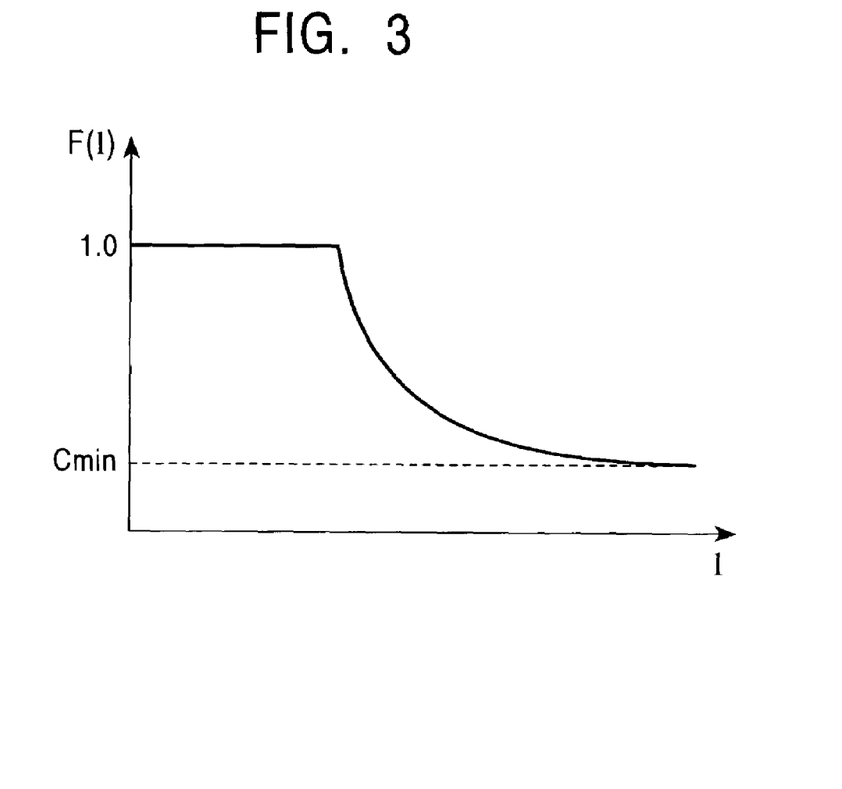
FIG. 3 illustrates a coefficient calculating function used in a coefficient calculator in the image processing apparatus shown in FIG. 1.

Based on the pixel value R(x,y) of the synthesized smoothed image R extracted by the smoothed image generator 10 as the illumination component, the coefficient calculator 11 calculates a coefficient C(x,y) expressed in equation (6) for converting the pixel value I(x,y) of the input image I using a non-linear coefficient calculating function F(l) shown in FIG. 3, for example. The coefficient C(x,y) is then fed to the multiplier 12.

$$C(x, y) = F(R(x, y)) \qquad (6)$$

The multiplier 12 multiplies the pixel value I(x,y) in the input image by the corresponding coefficient C(x,y). An output O(x,y) obtained from the multiplication is output to a transmission line, a storage device, and a display device (all these not shown).

Figure 4:
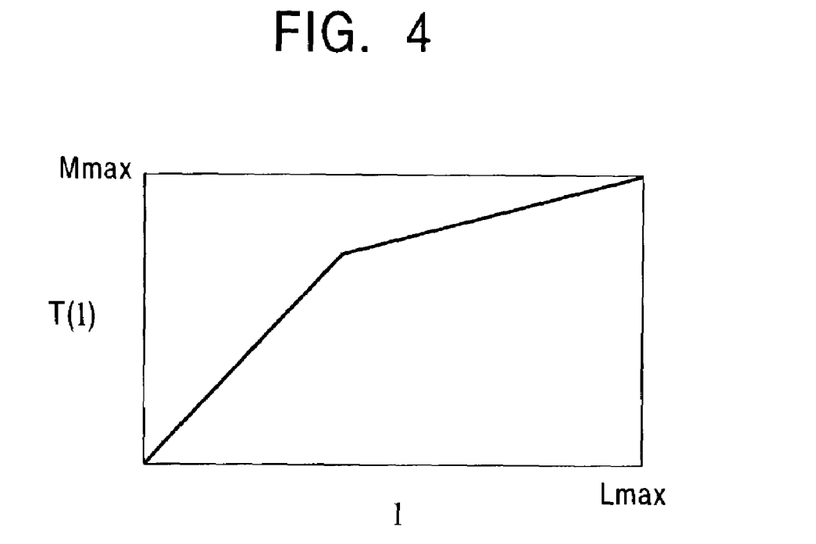
FIG. 4 illustrates a level conversion function used in the coefficient calculator in the image processing apparatus shown in FIG. 1.

The coefficient calculating function F(l) in equation (6) is obtained from equation (7) in accordance with the level conversion function T(l) illustrated in FIG. 4. Referring to FIG. 4, Lmax and Mmax represent the maximum values of the input level and output level, respectively.

$$F(l) = \frac{T(l)}{l} \tag{7}$$

The level conversion function T(l) has been conventionally used in the conversion of the gradation characteristics of an image. As already discussed in the section of the "Description of the Related Art," the level conversion function T(l) is applied in the dynamic range compression process by setting the dynamic range of an output signal to be narrower than the dynamic range of an input signal. In this case, the minimum value of the coefficient Cmin is Mmax/Lmax as illustrated in FIG. 3. Equation (7) means that the coefficient calculating function F(l) is determined as a ratio of pixel values prior to and subsequent to the dynamic range compression through the level conversion function T(l). Specifically, the coefficient C(x,y) calculated through equation (6) represents a compression ratio at which the pixel value R(x,y) of the synthesized smoothed image R as the illumination component is compressed by the level conversion function T(l). The multiplier 12 multiplies the pixel value I(x,y) by the coefficient C(x,y), thereby converting the pixel value for each pixel of the input image I, and thereby compressing dynamic range.

In the first embodiment, mainly, the first upsilon filter 20 and the smoothing units 51 and 52 (see FIG. 5) are specific examples of the "smoothing unit." Furthermore, mainly, the multiplier 12 (see FIG. 1) is a specific example of the "pixel value converting unit."

The operation and advantages of the image processing apparatus thus constructed will now be discussed. The discussion that follows also describes the image processing method.

The general operation of the image processing apparatus illustrated in FIG. 1 is discussed below. In the image processing apparatus, a signal of the input image I is input to the smoothed image generator 10 and the multiplier 12. As will be detailed later, the smoothed image generator 10 segments the input image I, smoothes each of a plurality of segmented images I, and generates the plurality of smoothed images RH0, RH1, and R2 (see FIG. 7) different from each other in the degree of smoothing. Furthermore, the smoothed image generator 10 calculates the edge intensity G based on the plurality of smoothed images RH0, RH1, and R2, and then synthesizes the plurality of smoothed images RH0, RH1, and R2 based on the calculated edge intensity G. The smoothed image generator 10 outputs as the illumination component the pixel value R(x,y) of the synthesized smoothed image R obtained by synthesizing the plurality of smoothed images RH0, RH1, and R2 to the coefficient calculator 11.

Based on the pixel value R(x,y) of the synthesized smoothed image R extracted by the smoothed image generator 10 as the illumination component, the coefficient calculator 11 calculates a coefficient (x,y) expressed in equation (6) for converting the pixel value I(x,y) of the input image I using a non-linear coefficient calculating function F(l) shown in FIG. 3. The calculated coefficient C(x,y) is then fed to the multiplier 12.

The multiplier 12 multiplies the pixel value I(x,y) in the input image by the corresponding coefficient C(x,y). Through the calculation by the multiplier 12, the pixel value of each pixel in the input image I is converted and the dynamic range is thus compressed.

In this way, the image signal O(x,y) output from the multiplier 12 is used in a video apparatus having a dynamic range narrower than that of the input image I, namely, in an environment where a number of bits expressing pixel levels is small (for example, when the input image is transmitted over a transmission line having a smaller bit width, when the input image is displayed on a display using a small number of bits, or when the input image is stored in a storage device using a smaller number of bits).

The process of the smoothed image generator 10 will now be discussed in detail with reference to FIG. 5 and FIG. 7. Referring to FIG. 5, the image I input to the smoothed image generator 10 is input to each of the first upsilon filter 20 and the first linear low-pass filter 21A.

The first upsilon filter 20 performs a linear filtering process on the input image I as expressed by equations (8A) and (8B). The first smoothed image RH0 having the smallest degree of smoothing and the highest resolution is generated and fed to the second synthesizer device 25B.

$$RH0(x, y) = \sum_{(dx,dy) \in NB} h(dx, dy) J(x + dx, y + dy) \tag{8A}$$

$$J(x+dx, y+dy) = \tag{8B}$$
$$\begin{cases} I(x+dx, y+dy) & \dots & /I(x+dx, y+dy) - I(x, y)/ \le E \\ I(x, y) & \dots & /I(x+dx, y+dy) - I(x, y)/ > E \end{cases}$$

Figure 6:
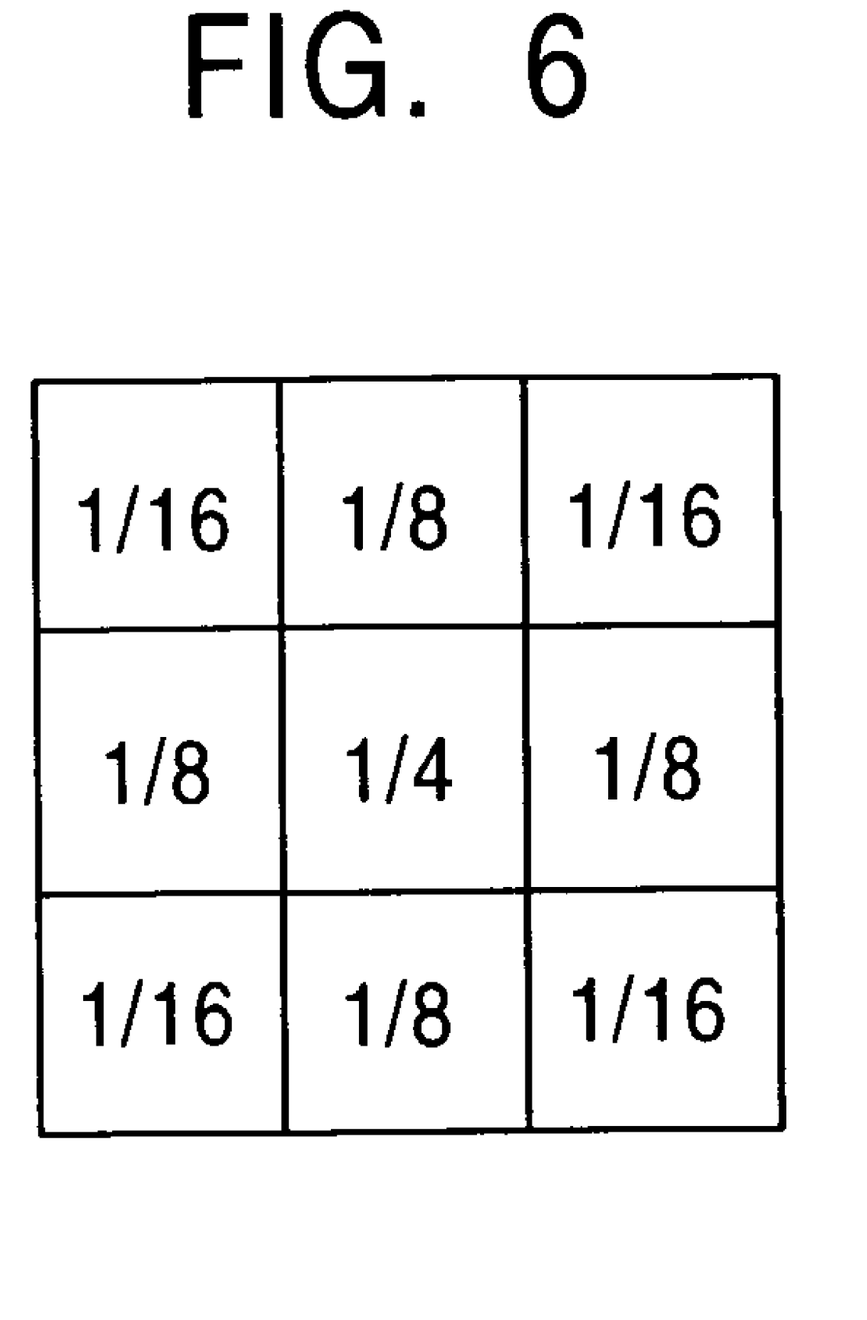
FIG. 6 is a chart of a linear low-pass filter in the smoothed image generator shown in FIG. 1.

In equations (8A) and (8B), NB represents a set of relative coordinates defining an adjacent area in the filtering process, and E is a predetermined threshold value. In the equations (8A) and (8B), h(dx,dy) is a filter coefficient for forming a linear filter (not shown) in the first upsilon filter 20, and is something like the one shown in FIG. 6.

The smoothing unit 51 generates the second smoothed image RH1 having a relatively large degree of smoothness and a low resolution compared with the first smoothed image RH0, by performing the down-sampling process and the filtering process to the input image I, as will be discussed later. The smoothing unit 52 performs, on the output image I1 of the first down-sampling unit 22A, the down-sampling process and the filtering process substantially identical to those carried out by the smoothing unit 51. The smoothing unit 52 thus generates the third smoothed image R2 having the largest degree of smoothing and the highest resolution.

The first linear low-pass filter 21A in the smoothing unit 51 prevents the generation of aliasing in the down-sampling process in the first down-sampling unit 22A, and performs an appropriate filtering process in response to the rate of down-sampling. The output IL of the first linear low-pass filter 21A is fed to the first down-sampling unit 22A to be down-sampled at a predetermined rate. The image I1 compressed by the first linear low-pass filter 21A and the first down-sampling unit 22A is fed to the second upsilon filter 20A and the second linear low-pass filter 21B.

The second upsilon filter 20A and the second linear low-pass filter 21B respectively work in the same way as the first upsilon filter 20 and the first linear low-pass filter 21A except that the second upsilon filter 20A and the second linear low-pass filter 21B receive the image I1 from the first down-sampling unit 22A as the input image.

The second upsilon filter 20A generates the second smoothed image RH1 by performing a non-linear filtering process on the output image I1 from the first down-sampling unit 22A, and then outputs the second smoothed image RH1 to the first synthesizer device 25A. The second linear low-pass filter 21B performs an appropriate filtering process in response to the rate of down-sampling in the second down-sampling unit 22B.

The output IL1 from the second linear low-pass filter 21B input to the second down-sampling unit 22B is subjected to a down-sampling process at a predetermined rate. The compressed image I2 is input to the third upsilon filter 20B.

The third upsilon filter 20B performs substantially the same function as that of the first upsilon filter 20. Specifically, the third upsilon filter 20B generates the third smoothed image R2 by performing a non-linear filtering process on the output signal I2 from the second down-sampling unit 22B, and outputs the third smoothed image R2 to the first up-sampling unit 23A.

The first up-sampling unit 23A performs an up-sampling process on the third smoothed image R2 at the same rate as that of the second down-sampling unit 22B. Specifically, when the down-sampling rate in the second down-sampling unit 22B is 1/N, the first up-sampling unit 23A inserts N−1 pixels, each having zero, between adjacent pixels.

The first interpolator 24A performs an appropriate interpolation process to the up-sampled image, resulting in an intermediate synthesized image RL1, and then outputting the intermediate synthesized image RL1 to the first synthesizer device 25A.

The first synthesizer device 25A calculates the edge intensity G as will be detailed later. Based on the edge intensity G, the first synthesizer device 25A synthesizes the second smoothed image RH1 from the second upsilon filter 20A and the intermediate synthesized image RL1 from the first interpolator 24A, thereby producing and then outputting the first synthesized smoothed image R1 to the second up-sampling unit 23B.

The second up-sampling unit 23B and the second interpolator 24B respectively have substantially the same functions as those of the first up-sampling unit 23A and the first interpolator 24A. The intermediate synthesized image RL0 generated in this way is fed to the second synthesizer device 25B.

The second synthesizer device 25B works in substantially the same way as the first synthesizer device 25A. Specifically, the second synthesizer device 25B synthesizes the first smoothed image RH0 output from the first upsilon filter 20 and the intermediate synthesized image RL0 output from the second interpolator 24B, thereby generating the second synthesized smoothed image R0. The second synthesizer device 25B outputs the second synthesized smoothed image R0 as a final synthesized smoothed image R to the coefficient calculator 11 (see FIG. 1).

The process of the synthesizer devices 25A and 25B is performed in the construction shown in FIG. 7 as described below. The first embodiment includes the synthesizers the number of which corresponds to the number of generated smoothed images. Each synthesizer synthesizes a plurality of smoothed images every predetermined number of smoothed images. The synthesis process is performed until all smoothed images are synthesized into one image.

Each of the synthesizer devices 25A and 25B receives the above-referenced intermediate synthesized image and smoothed image. The construction of the smoothed image generator 10 illustrated in FIG. 7 generates the first, second, and third smoothed images RH0, RH1, and R2 as the smoothed images. The intermediate synthesized images include the intermediate synthesized image RL1 generated based on the third smoothed image R2, and the intermediate synthesized image RL0 generated based on the second and third smoothed images R1 and R2. Each of the synthesizer devices 25A and 25B receives two images which are relatively close to each other in the degree of smoothing. The first synthesizer device 25A receives the intermediate synthesized image RL1 and the second smoothed image RH1. The second synthesizer device 25B receives the intermediate synthesized image RL0 and the first smoothed image RH0.

Specifically, each of the synthesizer devices 25A and 25B receives the intermediate synthesized image RLn generated from at least one smoothed image and having a large degree of smoothing and a low resolution, and a smoothed image RHn having a high resolution. The smoothed image RHn is then input to the difference unit 30 in the edge intensity calculator 70 and a third multiplier 33H in the synthesizer 71. The intermediate synthesized image RLn is fed to the difference unit 30 and the first derivative calculator 32 in the edge intensity calculator 70 and a fourth multiplier 33L in the synthesizer 71.

In the edge intensity calculator 70, the difference unit 30 determines a difference between the pixel value RLn(x,y) of the intermediate synthesized image RLn and the pixel value RHn(x,y) of the smoothed image RHn, thereby calculating a second derivative D2(x,y). The difference unit 30 then outputs the calculated second derivative value D2(x,y) to the absolute value calculator 31.

The absolute value calculator 31 calculates the absolute value AD2(x,y) of the difference value, namely, the second derivative D2(x,y) calculated by the difference unit 30, and then outputs the absolute value AD2(x,y) to the first multiplier 33A.

The first derivative calculator 32 calculates the absolute value AD1(x,y) of the first derivative of the pixel value RLn(x,y) in the intermediate synthesized image RLn in accordance with equation (9), and then outputs the calculated absolute value AD1(x,y) to the second multiplier 33B. In equation (9), d represents a constant representing a infinitesimal distance used to compute derivative.

$$AD1(x, y) = \sqrt{\sum_{dy=-d}^{d} [RLn(x-d, y+dy) -}$$

$$RLn(x+d, y+dy)] / + / \sum_{dx=-d}^{d} [RLn(x+dx, y-d) -$$

$$RLn(x+dx, y+d)] / \qquad (9)$$

The first and second multipliers 33A and 33B multiply the absolute value of the second derivative AD2(x,y) and the absolute value of the first derivative AD1(x,y) by predetermined weighting coefficients p2 and p1, respectively. The first and second multipliers 33A and 33B output the respective products to the first adder 34A.

The first adder 34A sums the weighted absolute values of the second derivative AD2(x,y) and the first derivative AD1(x,y) respectively supplied from the first and second multipliers 33A and 33B. In other words, the first adder 34A calculates the weighted sum of the absolute values of the second derivative AD2(x,y) and the absolute value of the first derivative AD1(x,y), thereby calculating the edge intensity G(x,y) of each pixel. The first adder 34A outputs the edge intensity G(x,y) calculated on a pixel by pixel basis to the normalizer 35.

The normalizer 35 normalizes the edge intensity G(x,y) calculated by the first adder 34A in accordance with equation (10), for example, thereby determining a weighting coefficient w(x,y) for each pixel value RHn(x,y) of the smoothed image RHn. The normalizer 35 then feeds the weighting coefficient w(x,y) to the third multiplier 33H while feeding the value {1−w(x,y)} to the fourth multiplier 33L as a weighting coefficient for a pixel value RLn(x,y) of the intermediate synthesized image RLn. In equation (10), Gmin and Gmax are the minimum value and the maximum value predetermined for the edge intensity G(x,y). As understood from equation (10), the weighting coefficient w(x,y) changes from pixel to pixel in accordance with the edge intensity G(x,y). The larger the edge intensity G(x,y), the larger the weighting coefficient w(x,y) becomes. As the edge intensity G(x,y) becomes small, the weighting coefficient {1−w(x,y)} of the intermediate synthesized image RLn(x,y) becomes large.

$$w(x, y) = \begin{cases} 1.0 & \ldots \ G(x, y) > G\max \\ \dfrac{G(x, y) - G\min}{G\max - G\min} & \ldots \ G\min \leq G(x, y) \leq G\max \\ 0.0 & \ldots \ G(x, y) < G\min \end{cases} \quad (10)$$

The third multiplier 33H multiplies the pixel value RHn(x,y) of the smoothed image RHn by the weighting coefficient w(x,y) sent from the normalizer 35, and outputs the resulting product to the second adder 34B. The fourth multiplier 33L multiplies the pixel value RLn(x,y) of the intermediate synthesized image RLn by the weighting coefficient {1−w(x,y)} sent from the normalizer 35, and outputs the resulting product to the second adder 34B.

The second adder 34B sums the weighted smoothed image RHn and the intermediate synthesized image RLn respectively supplied from the third and fourth multipliers 33H and 33L. In other words, the smoothed image RHn and the intermediate synthesized image RLn are synthesized as a weighted sum of the smoothed image RHn and the intermediate synthesized image RLn. A synthesized smoothed image Rn thus results.

The advantages of the present embodiment are now discussed. The problems of the conventional art have already been discussed in the section of "Description of the Related Art." To resolve the problems, one region of an image of the same illumination conditions needs to be smoothed with the border of the regions of different illumination conditions maintained. Experience has shown that a change in the pixel signal level due to a change in an illumination intensity is substantially larger than a change in the pixel signal level due to a reflectivity of the surface of an object. As a result, an edge having a large pixel signal change in level occurs at the illumination border. The upsilon filter is known as smoothing means having an excellent ability to store an edge. The use of the upsilon filter is expected to allow a precise illumination component to be extracted.

An area under the influence of a single illumination is typically wide on an image. To extract an illumination component efficiently, a filter covering a relatively wide neighboring area with respect to a target pixel is required. This in turn requires a large amount of calculation. One method contemplated to reduce the amount of calculation is an equivalently large-capacity filter which is constructed of a combination of a relatively small-capacity filter and a down-sampling unit. Even if a filter having an excellent ability to store an edge is used, an image subjected to a down-sampling process and having a low resolution suffers from a blurring in the position information of an edge in the range of the sampling period. To smooth the region of the same illumination conditions with the illumination border maintained, a low-resolution must be used together with a high-resolution image. In the synthesis process, a high-resolution image having a small degree of smoothing is selected in the vicinity of an edge while a low-resolution image having a large degree of smoothing is used in the remaining area.

In the first embodiment, the edge intensity G(x,y) is calculated by the edge intensity calculator 70 including the difference unit 30, the absolute value calculator 31, the first derivative calculator 32, the first multiplier 33A, the second multiplier 33B, and the first adder 34A as shown in FIG. 7. This calculation is mathematically expressed by equation (11).

$$G(x, y) = p1 \left| \frac{d^2}{dx\,dy} RLn(x, y) \right| + p2 \left| RHn(x, y) - RLn(x, y) \right| \quad (11)$$

In equation (11), the first term in the right-hand side is a first derivative of a low-resolution image (RLn), and has a large value in the center of an edge. The second term in the right-hand side is a difference between the low-resolution image (RLn) and the high-resolution image (RHn), treated as a second derivative, and has a large value in the vicinity of the edge. The sum of these terms allows the vicinity of the edge to be easily detected. In the first embodiment, the edge intensity calculator 70 performs the above-referenced calculation in this way, thereby successfully detecting the edge. When a plurality of images is switched one from another, it is necessary to avoid a discontinuous switching where there exists a large difference in the pixel values between images. In the first embodiment, the difference unit 30 shown in FIG. 7 calculates a difference between the low-resolution image and the high-resolution image as the second derivative, and then attaches the corresponding weight to the difference. When there is a large difference between two images to be synthesized, in the synthesizer 71, high-resolution images are always selected. Discontinuous switching takes place less when the plurality of images is switched.

In accordance with the first embodiment, as discussed above, a plurality of filtering processes and down-sampling processes is performed, thereby generating a plurality of smoothed images. The plurality of smoothed images is then synthesized. A filtering process having an equivalently large scale (a smoothing process) is performed on the input image I. The amount of calculation required of individual filtering processes and down-sampling processes is reduced. The amount of calculation for smoothing is thus reduced more than when a single large-capacity filter is employed. Referring to FIG. 7, the edge intensity G is calculated based on the plurality of smoothed images (images RHn and RLn), and the plurality of images is synthesized based on the edge intensity G. Even if the down-sampling process is performed, the edge is successfully detected. Under the presence of a plurality of illuminations, the amount of computation is reduced and the border is appropriately extracted. The dynamic range is thus compressed in a subjectively preferable fashion.

The first embodiment employs the upsilon filters 20, 20A, and 20B (see FIG. 5) to generate a smoothed image. Alternatively, other non-linear filters such as a median filter may be used. A linear filter may be employed to further reduce the amount of calculation.

Different parameters may be employed for each resolution when a plurality of smoothed images different from each other in resolution is generated. For example, the down-sampling rates of the down-sampling units 22A and 22B and the up-sampling rates of the up-sampling units 23A and 23B and the threshold values of the upsilon filters 20, 20A, and 20B may be changed from resolution to resolution.

The first embodiment has been discussed in connection with the synthesis of the smoothed images RH0, RH1, and R2 having the respective resolutions. The number of the generated smoothed images may be increased or decreased depending on the number of the pixels in the input image I.

In the synthesizer devices 25A and 25B shown in FIG. 7, the input relationship between the smoothed image RHn and the intermediate synthesized image RLn may be reversed to calculate the first derivative of the smoothed image RHn of the high-resolution side. Specifically, the intermediate synthesized image RLn may be input to the difference unit 30 and the third multiplier 33H, and the smoothed image RHn may be input to the difference unit 30, the first derivative calculator 32, and the fourth multiplier 33L.

Second Embodiment

A second embodiment of the present invention will now be discussed. In the discussion that follows, components identical in function to those discussed in the first embodiment are designated with the same reference numerals, and the discussion thereof is omitted here.

Figure 8:
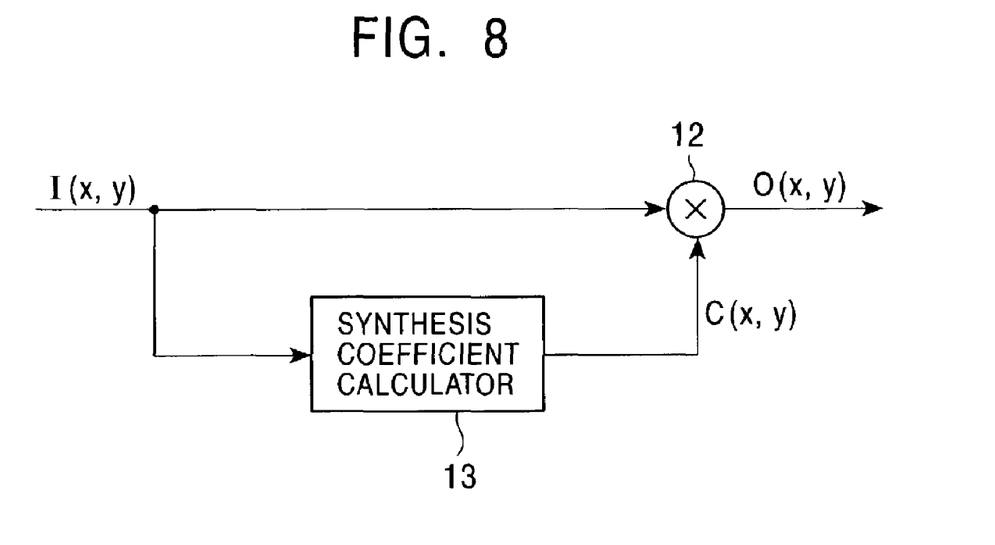
FIG. 8 is a block diagram illustrating the image processing apparatus in accordance with a second embodiment of the present invention.

FIG. 8 illustrates the construction of an image processing apparatus in accordance with the second embodiment of the present invention. In the image processing apparatus of the second embodiment, the function of the coefficient calculator 11 is included into the smoothed image generator 10. Specifically, a combination of the coefficient calculator 11 and the smoothed image generator 10 in the first embodiment is thus combined into a synthesis coefficient calculator 13 in the second embodiment.

Referring to FIG. 8, the synthesis coefficient calculator 13 calculates the coefficient $C(x,y)$ for use in the conversion of the pixel value $I(x,y)$, and outputs the coefficient $C(x,y)$ to the multiplier 12. As in the first embodiment, the multiplier 12 multiplies each pixel value $I(x,y)$ of the input image by the corresponding coefficient $C(x,y)$, and outputs the product as an image signal $O(x,y)$ to a transmission line, a storage device, or a display device (all these components not shown).

Figure 9:
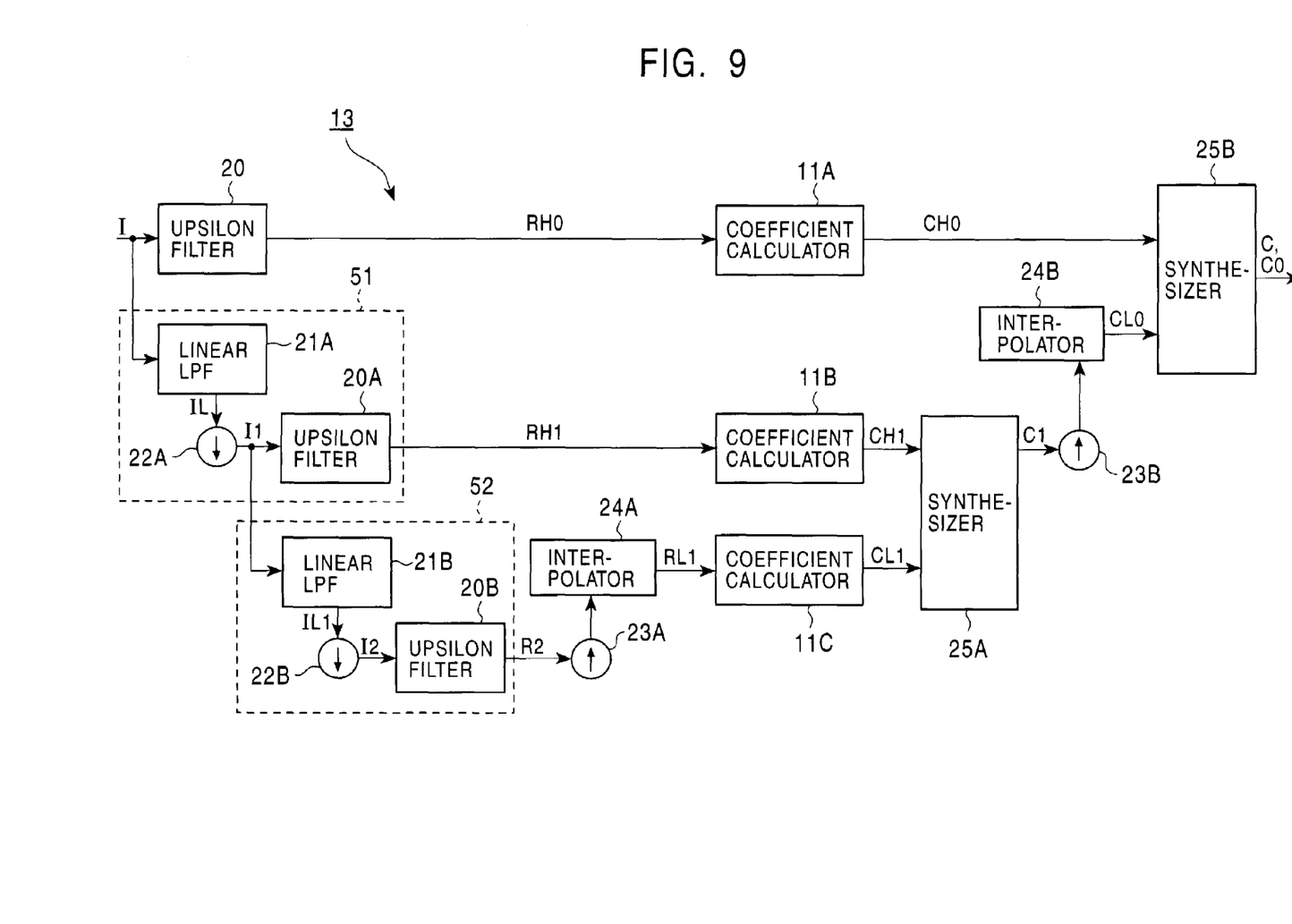
FIG. 9 is a block diagram illustrating the construction of a synthesis coefficient calculator in the image processing apparatus shown in FIG. 8.

FIG. 9 illustrates the construction of the synthesis coefficient calculator 13. The construction of the synthesis coefficient calculator 13 remains substantially identical to the smoothed image generator 10 in the first embodiment, except that the synthesis coefficient calculator 13 includes coefficient calculators 11A, 11B, and 11C. The coefficient calculator 11A is arranged in a signal path extending between the first upsilon filter 20 and the second synthesizer device 25B. The coefficient calculator 11B is arranged in a signal path extending between the second upsilon filter 20A and the first synthesizer device 25A. The coefficient calculator 11C is arranged in a signal path extending between the first interpolator 24A and the first synthesizer device 25A.

The coefficient calculators 11A, 11B, and 11C function in substantially the same way as the coefficient calculator 11 (see FIG. 1) used in the first embodiment. The coefficient calculator 11A calculates, from a pixel value $RH0(x,y)$ of a first smoothed image RH0, a coefficient $CH0(x,y)$ which is used to convert the pixel value in accordance with equation (6), and then feeds the coefficient $CH0(x,y)$ to the second synthesizer device 25B. Similarly, the coefficient calculator 11B calculates a coefficient $CH1(x,y)$ from a pixel value $RH1(x,y)$ of a second smoothed image RH1, and then feeds the coefficient $CH1(x,y)$ to the first synthesizer device 25A. Also similarly, the coefficient calculator 11C calculates a coefficient $CL1(x,y)$ from a pixel value $RL1(x,y)$ of an intermediate synthesized image RL1, and then feeds the coefficient $CL1(x,y)$ to the first synthesizer device 25A. The coefficients $CH0(x,y)$, $CH1(x,y)$, and $CL1(x,y)$ thus calculated have different resolutions.

In the first embodiment illustrated in FIG. 7, each of the synthesizer devices 25A and 25B receives and synthesizes the intermediate synthesized image RLn and the smoothed image RHn, thereby generating the synthesized smoothed image Rn. In the second embodiment, coefficients CHn and CLn (n=0 or 1), instead of the intermediate synthesized image RLn and the smoothed image RHn, are fed to each of the synthesizer devices 25A and 25B, and a synthesis coefficient Cn is generated. A synthesis coefficient C0 calculated by the second synthesizer device 25B at the final stage is output to the multiplier 12 as a final coefficient $C(x,y)$.

As in the first embodiment, each of the first synthesizer devices 25A and 25B in the second embodiment switches between the coefficient CLn corresponding to the low-resolution image RLn and the coefficient CHn corresponding to the high-resolution RHn, based on the edge $G(x,y)$ calculated in accordance with equation (11), and thereby performs the synthesis process. As in the first embodiment, the effect of the second term in the right-hand side of equation (11) makes it less possible for a large discontinuity to take place in the synthesis coefficient Cn corresponding to the synthesized smoothed image Rn as a result of switching of pixels in an area where there is a large difference between pixel values. A spatial change in a coefficient $C(x,y)$ to be multiplied by the input image I also depends on the coefficient calculating function $F(l)$. A slight change in the synthesis coefficient Cn is amplified by the coefficient calculating function $F(l)$, thereby possibly causing a large discontinuity in the final coefficient $C(x,y)$.

In accordance with the second embodiment, each of the coefficient calculators 11A, 11B, and 11C calculates the coefficient calculating function $F(l)$ for each smoothed image having the respective resolution. The edge intensities $G(x,y)$ of the resulting coefficients CHn and CLn are determined by the synthesizer devices 25A and 25B. Based on the edge intensity $G(x,y)$, the synthesizer 71 (see FIG. 7) synthesizes the coefficients by switching the two coefficients CLn and CHn. The generation of a discontinuity in the coefficient C due to the synthesis is minimized.

In accordance with the image processing method and the image processing apparatus, the edge intensity is calculated based on the plurality of smoothed images different from each other in the degree of smoothing. The plurality of smoothed images is synthesized based on the calculated edge intensity. The coefficient for use in the conversion of the pixel values of the input image is calculated based on the synthesized smoothed image. The pixel value of the input image is converted in accordance with the coefficient. Even when there is a plurality of different illuminations, the border therebetween is detected. A dynamic range compression subjectively preferable is thus performed.

What is claimed is:

1. An image processing method for converting an input image into an image having a relatively narrow dynamic range, the image processing method comprising:
   a smoothing step for smoothing each of a plurality of images, into which the input image is segmented, to generate a plurality of smoothed images different from each other in the degree of smoothing,
   an edge intensity calculating step for calculating an edge intensity based on the plurality of smoothed images,
   a synthesizing step for synthesizing the plurality of smoothed images based on the calculated edge intensity,
   a coefficient calculating step for calculating a coefficient for use in the conversion of pixel values of the input image based on the synthesized smoothed image generated through the synthesis of the plurality of smoothed images, and
   a pixel value converting step for converting the pixel values of the input image based on the calculated coefficient.

2. An image processing method according claim 1, wherein the edge intensity calculating step calculates the edge intensity by determining a weighted sum of a first derivative and a second derivative calculated from the plurality of smoothed images.

3. An image processing method according to claim 2, wherein the edge intensity calculating step calculates the second derivative of the plurality of smoothed images from a difference between two smoothed images that are close to each other in the degree of smoothing.

4. An image processing method according to claim 1, wherein the synthesizing step synthesizes an intermediate synthesized image generated from at least one smoothed image and having a relatively large degree of smoothing and another unsynthesized smoothed image having a relatively small degree of smoothing, and repeats the synthesis process until all smoothed images are synthesized into one image.

5. An image processing method according to claim 4, wherein the synthesizing step synthesizes the intermediate synthesized image and the other smoothed image by determining the weighted sum of the intermediate synthesized image and the other smoothed image.

6. An image processing method according to claim 5, wherein the synthesizing step changes a weight in the weighted sum from pixel to pixel based on the edge intensity.

7. An image processing method according to claim 6, wherein the synthesizing step increases the weight of the intermediate synthesized image as the edge intensity decreases when the intermediate synthesized image and the other smoothed image are synthesized in the synthesizing step.

8. An image processing method according to claim 1, wherein the coefficient calculating step calculates the coefficient by non-linearly converting each pixel value of the synthesized smoothed image.

9. An image processing method according to claim 1,
   wherein the synthesizing step synthesizes the plurality of smoothed images based on the edge intensity, and outputs the synthesized smoothed image as a smoothed image inputted in the coefficient calculating step,
   the coefficient calculating step calculates a plurality of coefficients in the conversion of the pixel values by performing a non-linear conversion on the pixels value of each smoothed image, and
   the pixel value converting step converts the pixel values of the input image based on the coefficient generated as a result of the synthesis of the plurality of coefficients.

10. An image processing apparatus for converting an input image into an image having a relatively narrow dynamic range, the image processing apparatus comprising:
    smoothing means for smoothing each of a plurality of images, into which the input image is segmented, to generate a plurality of smoothed images different from each other in the degree of smoothing,
    edge intensity calculating means for calculating an edge intensity based on the plurality of smoothed images,
    synthesizing means for synthesizing the plurality of smoothed images based on the calculated edge intensity,
    coefficient calculating means for calculating a coefficient for use in the conversion of pixel values of the input image based on the synthesized smoothed image generated through the synthesis of the plurality of smoothed images, and
    pixel value converting means for converting the pixel values of the input image based on the calculated coefficient.

11. An image processing apparatus according claim 10, wherein the edge intensity calculating means calculates the edge intensity by determining a weighted sum of a first derivative and a second derivative calculated from the plurality of smoothed images.

12. An image processing apparatus according to claim 11, wherein the edge intensity calculating means calculates the second derivative of the plurality of smoothed images from a difference between two smoothed images that are close to each other in the degree of smoothing.

13. An image processing apparatus according to claim 10, wherein the synthesizing means synthesizes an intermediate synthesized image generated from at least one smoothed image and having a relatively large degree of smoothing and another unsynthesized smoothed image having a relatively small degree of smoothing.

14. An image processing apparatus according to claim 13, wherein the synthesizing means synthesizes the intermediate synthesized image and the other smoothed image by determining the weighted sum of the intermediate synthesized image and the other smoothed image.

15. An image processing apparatus according to claim 14, wherein the synthesizing means changes a weight in the weighted sum from pixel to pixel based on the edge intensity.

16. An image processing apparatus according to claim 15, wherein the synthesizing means increases the weight of the intermediate synthesized image as the edge intensity decreases when the intermediate synthesized image and the other smoothed image are synthesized.

17. An image processing apparatus according to claim 10, wherein the coefficient calculating means calculates the coefficient by non-linearly converting each pixel value of the synthesized smoothed image.

18. An image processing apparatus according to claim 10,
    wherein the synthesizing means synthesizes the plurality of smoothed images based on the edge intensity, and outputs the synthesized smoothed image as a smoothed image inputted in the coefficient calculating means,
    the coefficient calculating means calculates a plurality of coefficients in the conversion of the pixel values by performing a non-linear conversion on the pixels value of each smoothed image, and
    the pixel value converting means converts the pixel values of the input image based on the coefficient generated as a result of the synthesis of the plurality of coefficients.

* * * * *